US007020558B2

(12) United States Patent
Voutay et al.

(10) Patent No.: US 7,020,558 B2
(45) Date of Patent: Mar. 28, 2006

(54) METHOD OF MEASURING LOCAL SIMILARITIES BETWEEN SEVERAL SEISMIC TRACE CUBES

(75) Inventors: Olivier Voutay, Paris (FR); Frédérique Fournier, Cormeilles En Parisis (FR); Jean-Jacques Royer, Nancy (FR)

(73) Assignee: Institut Francais Du Petrole, Rueil Malmaison Cedex (FR)

( * ) Notice: Subject to any disclaimer, the term of this patent is extended or adjusted under 35 U.S.C. 154(b) by 165 days.

(21) Appl. No.: 10/770,602

(22) Filed: Feb. 4, 2004

(65) Prior Publication Data

US 2004/0220744 A1 Nov. 4, 2004

(30) Foreign Application Priority Data

Feb. 4, 2003 (FR) .................................. 03 01291

(51) Int. Cl.
*G01V 1/28* (2006.01)

(52) U.S. Cl. .......................................... 702/16; 702/17

(58) Field of Classification Search .................. 702/14, 702/16, 17, 18; 367/73; 703/6, 9, 10
See application file for complete search history.

(56) References Cited

U.S. PATENT DOCUMENTS 6,223,126 B1 * 4/2001 Neff et al. .................... 702/16
6,516,274 B1 * 2/2003 Cheng et al. ................. 702/14
6,597,994 B1 * 7/2003 Meek .......................... 702/16
6,651,006 B1 * 11/2003 Trappe et al. ................. 702/14
2004/0210394 A1 * 10/2004 Trappe et al. ................ 702/14

OTHER PUBLICATIONS

S. Chopra, et al., "Fault Interpretation—the Coherence Cube and Beyond", Oil and Gas Journal, Pennwell Publishing Co., Tulsa, US, vol. 98, No. 31, Jul. 31, 2000, pp. 71-74, XP001008962, ISSN: 0030-1388.

(Continued)

*Primary Examiner*—Donald McElheny, Jr.
(74) *Attorney, Agent, or Firm*—Antonelli, Terry, Stout and Kraus, LLP.

(57) ABSTRACT

A Method of measuring local similarities between seismic trace cubes (3D survey) obtained from a volume of an underground zone, corresponding to prestack data or to repeated seismic surveys (4D survey). For each point of the volume considered, the method comprises a) extracting, from each seismic trace cube, a volume neighborhood centered on a point, referred to as current point, and consisting of a set of seismic traces in limited number; b) applying an analysis technique referred to as (GPCA) allowing defining synthetic variables; and c) determining a coherence value from the synthetic extracted variables measuring the local similarity between the seismic trace cubes extracted from the volume neighborhood of the current point. The coherence value thus calculated is assigned to the current point. The coherence values of all of the current points form a coherence cube. An application is finer monitoring of the evolution with time of a reservoir under development.

25 Claims, 8 Drawing Sheets

OTHER PUBLICATIONS

S. Chopra, et al., "Integrating Coherence Cube Imaging and Seismic Inversion", The Leading Edge, Society of Exploration Geophysicists, US, vol. 20, No. 4, Apr. 2001, pp. 354, 356, 360, and 362, XP 001039192, ISSN: 1070-485X.

M. Bahorich and S. Farmer, "The Coherence Cube", The Leading Edge, vol. 14, No. 10, Oct. 1995, pp. 1053-1058, XP002257906.

K.J. Marfurt, et al., "3-D Seismic Attributes Using a Semblance-Based Coherency Algorithm", Geophysics, Society of Exploration Geophysicists, Tulsa, US, vol. 63, No. 4, Jul. 1998, pp. 1150-1165, XP002195379, ISSN: 0016-8033.

A. Gersztenkorn, et al., "Eigenstructure-based Coherence Computations as an Aid to 3-D Structural and Stratigraphic Mapping", Geophysics, vol. 64, No. 5, Sep. 1999-Oct. 1999, pp. 1468-1479, XP002257907.

Preliminary Search Report.

* cited by examiner

METHOD OF MEASURING LOCAL SIMILARITIES BETWEEN SEVERAL SEISMIC TRACE CUBES

BACKGROUND OF THE INVENTION

1. Field of the Invention

The present invention relates to a method of measuring local similarities between prestacked 3D seismic trace cubes obtained from a volume of an underground zone, or after repetitive prospecting surveys (4D). A local coherence measurement gives in the first place the similarity of a seismic cube in relation to another one, while accounting for the local similarity within a single cube.

2. Description of the Prior Art

The concept of proper coherence is a relatively recent development. Until now, the issue was to develop a tool revealing the stratigraphic or structural changes (notably faults) from seismic measurements, and thus to obtain volume information on these changes. The foundation of all the methods developed for less than ten years defines a local dissimilarity from trace to trace.

A first algorithm described by: Bahorich, M., and Farmer, S. (1995), "The Coherence Cube", *The Leading Edge,* 14, 10, 1053–1058, calculates the cross-correlation between each trace of a seismic cube with two in-line neighbors, with two CDP (common depth point) neighbors, then in combining the two results, after normalization the neighbor by the energy of the traces. The coherence is estimated only from three traces, which makes calculation very fast but not very robust if the data contains noise.

According to another algorithm described by Marfurt, K. J., t al. (1998), "3-D Seismic Attributes Using a Semblance-based Coherency Algorithm", *Geophysics,* 63,1150–1165, the coherence calculation is based on a local semblance calculation involving more traces, which makes the result more robust to noise.

According to another algorithm described by Gersztenkorn, A., and Marfurt, K. J. (1999), "Eigenstructure based Coherence Computations as an Aid to 3-D Structural and Stratigraphic Mapping", *Geophysics,* 64, 1468–1479, the coherence calculation is based on an expansion into eigenvalues: an analysis window defined in lines, CDP and time is extracted from the seismic cube, the seismic trace covariance matrix is formed and the largest eigenvalue of this matrix is calculated. The coherence value then corresponds to the ratio between this eigenvalue and the sum of all the eigenvalues of the covariance matrix, or trace of the covariance matrix, which is the total variance of the seismic traces of the analysis window.

All these approaches however have certain limits. In particular, a major limitation is that they are not applicable to the analysis of seismic multicube data.

In fact, the goal of these various coherence attributes is rather to map stratigraphic anomalies with the attributes not allowing evaluation of the coherence, either calendar (4D) or AVO ("Amplitude Versus Offset"). What is known is that there is to date no algorithm allowing to determine such attributes.

Generalized Principal-Component Analysis (GPCA) is a known tool allowing showing a possible information redundancy between groups of seismic attributes; GPCA can be suited for defining a local seismic data similarity measurement, from one cube to another, by analyzing a neighborhood around a current point, the notion of a group of attributes being related to the surveys in time or to for example the prestack seismic surveys.

This technique is implemented in the method described in French patent application 02/11,200 filed by the assignee, for compacting and filtering seismic events read on "multicube" seismic traces, with distribution of these events in families corresponding each to a particular physical meaning: iso-offset or iso-incidence angle data cube, elastic parameter cubes resulting from a joint stratigraphic inversion, etc., in order to extract information on the nature of the subsoil. This method comprises forming, by combination of the seismic variables, synthetic variables in much smaller number, obtained by construction of an orthogonal vectorial base in each one of the analysis sets consisting of the data of each family, hence formation of an orthonormal vectorial base describing these analysis sets, and use of this orthonormal vectorial base (new attributes) for filtering and describing said seismic events.

SUMMARY OF THE INVENTION

The method according to the invention provides measurement of the local similarity between several 3D prestack or 4D (repeated in time) seismic data cubes The method comprises the following steps:

a) at each point of the volume studied and characterized by several seismic cubes, extracting a volume neighborhood centered on this point (current point) and including a set of seismic traces in limited number; thus, each current point is characterized by as many groups of seismic attributes as there are cubes analyzed;

b) applying the GPCA analysis technique to these groups of seismic attributes extracted from each seismic cube in the volume neighborhood of the current point to form synthetic variables;

c) determining a coherence value from the synthetic extracted variables, which is assigned to the current point;

d) repeating steps a) to c) for each point; and e) grouping all of the coherence values into a coherence cube.

The values contained in the coherence cube give the degree of local similarity sought between the seismic data cubes.

The projections of the synthetic variables on the various cubes in the neighborhood of the current point represent part of the information of the corresponding group. This information or variance part is known. Consequently, several approaches can be considered for calculation of the coherence attribute from the correlation values calculated between the synthetic variables and their projections on the cubes in the neighborhood of the current point.

According to an implementation mode, for each point, the coherence value taken is the mean value of the squares of the correlations between the synthetic variables and their projections on the cubes in the neighborhood of the current point, on a limited number k of the synthetic variables.

The value of k is determined, for example, as the smallest number of synthetic variables allowing reaching a variance threshold explained by the projections of the synthetic variables on each cube with this threshold having been previously determined.

According to another implementation mode, a number of synthetic variables is selected depending on their correlations with the groups of attributes associated with the volume neighborhood of the current point. The coherence value assigned to the current point is equal to the weighted sum of the squares of the correlations between the synthetic considered variables and their projections on the cubes in the neighborhood of the current point.

For a correlation value, the weighting value selected is for example the variance percentage explained by the projection of the synthetic variable on the corresponding group divided by the sum of the variances of all the projections of the synthetic variables considered on the same group.

According to another implementation mode, a threshold is set on the variance percentage explained by the projections of the synthetic variables on the cubes, in the neighborhood of the current point, that has to be taken into account. The coherence value is then equal to the weighted sum of the squares of the correlations between the synthetic variables and their projections on the cubes in the neighborhood of the current point, so that the number of synthetic variables taken into account allows this threshold to be reached.

For a determined correlation value, a weighting value equal to p (number of cubes) times the set variance threshold is for example selected.

As the case may be, the volume neighborhood can be extracted from seismic trace cubes obtained either after a 3D seismic survey, each one corresponding to the same incidence angle or to the same offset, or after successive seismic exploration surveys in the zone.

The volume neighborhood can also be extracted from residue cubes obtained either after a prestack stratigraphic inversion or from residue cubes obtained after a poststack stratigraphic inversion. It can also be extracted from the inverted cubes (prestack or poststack) and from the residue cubes.

The method is particularly advantageous in that it allows defining a new attribute measuring a local similarity between seismic cubes extracted from a neighborhood around a point. It allows taking account for the multicube aspect of the seismic data and measures more the variability from one seismic cube to another than the variability within a single cube.

DETAILED DESCRIPTION OF THE INVENTION

The concept of coherence has especially been applied so far for seeking stratigraphic anomalies and the coherence values calculated from a single seismic data cube, usually the poststack cube.

With the method described hereafter, a coherence cube is formed from several 3D seismic data cubes (AVO or 4D) showing at any point the degree of local similarity or dissimilarity of the seismic data, cube to cube, on a volume neighborhood around a current point, and thus allowing mapping what changes or does not change from one cube to the next.

As described above, GPCA is a technique allowing showing what is common and what is different between p groups of variables or of seismic attributes, and to rapidly determine if all the groups are linearly identical. Calculation of a coherence cube in carries out a local measurement of the similarity (or dissimilarity) from one seismic cube to another, while taking also into account the local similarity around the current point within a single cube.

Consider p seismic trace cubes. The trace cubes can correspond, for example, to poststack seismic surveys repeated in time in a single geographic zone (4D seismic cubes), or to iso-angle or iso-offset prestack 3D seismic cubes.

Figure 1:
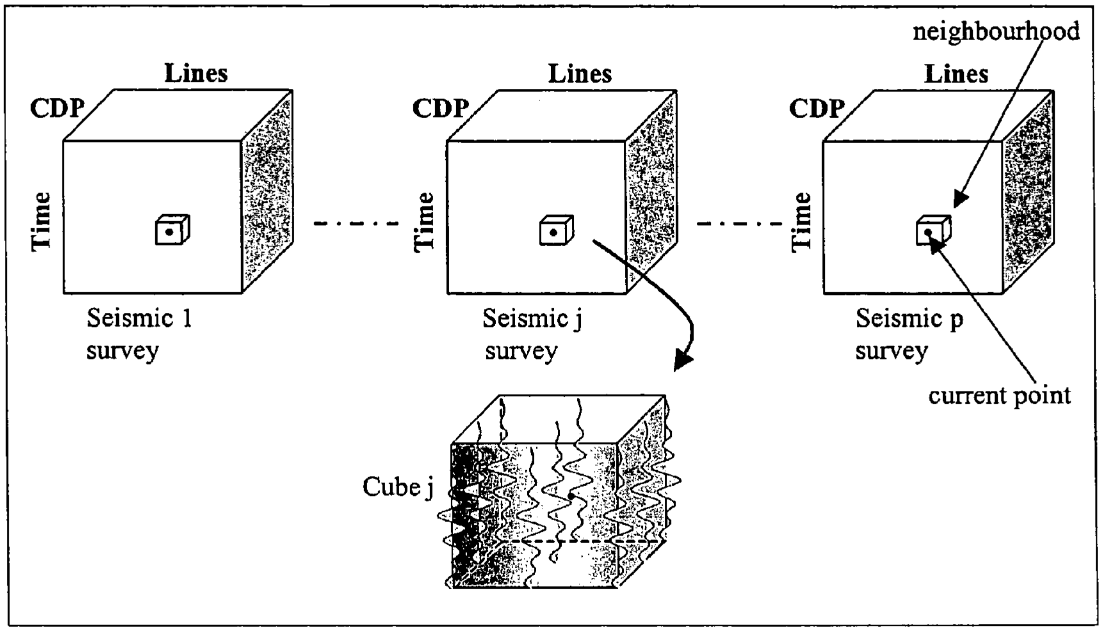
FIG. 1 shows the extraction of seismic cubes for coherence analysis, in the neighborhood of a current point.

A volume neighborhood centered on a coordinate (Line; CDP (common depth point), time and depth) and having of a limited number of traces is extracted from each one of the p seismic cubes (FIG. 1). The number of traces forming this neighborhood is discussed below. We have p sets of traces of equal dimension centred on a point of equal geographic coordinates, and corresponding to the p initial seismic cubes.

A GPCA is carried out on the p sets thus extracted. Each extracted set in the neighborhood of the current point corresponds to a group of initial seismic attributes, these attributes being simply, for example, the series of the amplitude values corresponding to the different values of the trace in the time window studied. The total number of attributes is thus equal to p times the vertical dimension of the neighborhood considered.

Figure 2:
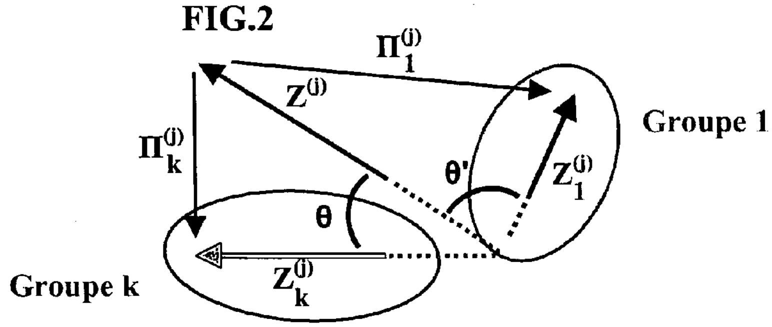
FIG. 2 shows the projections of synthetic variable $Z^{(j)}$ on groups 1 and k.

The square of the correlation can be calculated between synthetic variable $Z^{(j)}$ and the projection of $Z^{(j)}$ on a group of attributes (FIG. 2). The square of the correlation corresponds, in fact, to the square of the cosine of the angle θ between the two vectors representing respectively the synthetic variable and the projection of the synthetic variable. The square gives an indication of the degree of proximity between these two vectors, and therefore between synthetic variable $Z^{(j)}$ and the corresponding group; a value 1 indicates that the synthetic variable and the projection thereof merge, whereas a value far from 1 gives an indication of the distance between them.

Thus, when all the groups of attributes are similar to each other, the square of cosines of the angles between all the $Z^{(j)}$ and their projections are equal to 1. In the opposite case, when the similarity is weak, the squares of the correlations are far from 1 for a certain number of $Z^{(j)}$ and are all the further therefrom, for a number of correlation, as the groups of attributes are different.

Now, the projections of each $Z^{(j)}$ on the various groups represent part of the information of the corresponding group. This variance part can be known and calculated. Several approaches can then be considered for calculation of the coherence attribute from these correlation values.

First Approach

A simple first approach calculates the mean value of the squares of the correlations on a number k of $Z^{(j)}$ ($k \leqq p$). Number k is selected as follows:

(i) a threshold S on the cumulative variance is set, for example 90%, (ii) k is then determined as the smallest number of synthetic variables $Z^{(j)}$ allowing this threshold to be reached.

In this case, the number of synthetic variables considered in the calculation of the correlations is identical for each group and the weight assigned to each correlation is the same.

$$c = \frac{1}{p \times k} \sum_{i=1}^{p} \sum_{j=1}^{k} \rho^2\left(Z^{(j)}, Z_i^{(j)}\right)$$

Second Approach

A second approach selects the number of synthetic variables $Z^{(j)}$ according to their correlation with the groups: in general, the first variables are sufficient because, by principle, the first variable represents a part of the information common to the groups.

Once this number is set, and unlike the first approach, the sum, weighted by the variances, of the squares of the correlations between the $Z^{(j)}$ considered and their projections on the groups is calculated. The squares of the correlations between a vector $Z^{(j)}$ and it projects thereof on the various groups can in fact all be equal to 1, whereas the explained variance part is small.

Weighting by the variance then allows accounting for the compaction capacity of the synthetic variables extracted from the GPCA in the coherence calculation, and to avoid assigning too great a value if, in reality, the trace cubes studied are similar only in a small way. In this case, the weight $p_{i,j}$ assigned to each correlation is equal to the variance explained by the projection of synthetic variable $Z^{(j)}$ on the corresponding group i, divided by the sum of all the variances. This "normalization" ensures that the sum of the weights is equal to 1.

$$c = \sum_{i=1}^{p} \sum_{j=1}^{k} p_{i,j} \times \rho^2\left(Z^{(j)}, Z_i^{(j)}\right)$$

Besides the weighting difference with the first approach, it can be noted that the variance part taken into account in each group can be different.

Third Approach

Finally, a third approach is, as in the first approach, sets a threshold on the total explained variance part to be taken into account. But this time, for each group i, the number $k_i$ of synthetic variables $Z^{(j)}$ considered will be strictly the number allowing the threshold to be reached. Thus, this number can be different from one group to the next. The "mean" correlation will be estimated with all of the elementary correlations of the synthetic variables required for each group.

$$c = \sum_{i=1}^{p} \sum_{j=1}^{k_i} p_{i,j} \times \rho^2\left(Z^{(j)}, Z_i^{(j)}\right)$$

The weight $p_{i,j}$ given to each correlation is then equal to the variance explained by the projection of the synthetic variable $Z^{(j)}$ on group i divided by p times the variance threshold selected. This "normalization" thus allows to have a sum of weights equal to 1.

Two parameters characterizing the size of the analysis neighborhood around the current point have to be determined: the number of traces of the neighborhood and the vertical dimension (in time or depth) of the traces. If a small number of traces is taken into account, for example nine traces per neighborhood, the result will spatially appear to contain more noise than if each neighborhood has more traces, 25 for example. On the other hand, the greater the vertical dimension, the more the coherence result can be expected to be vertically smoothed. Furthermore, as the variability can increase, the variance threshold is to be set in the coherence attribute calculation according to the third method is different depending on the vertical dimension of the analysis window. Similarly, the compaction capacity of the synthetic variables can be expected to be all the higher as the dimension of the window is small.

APPLICATION EXAMPLES

1—Application to 4D Seismic Data

Repeated seismic methods carry out seismic surveys in a single geographic zone in order to analyze and to map the changes that may occur in a reservoir after production has started. Calculation of a coherence attribute on 4D data has two goals:

1) indicate more precisely the reproducibility of the seismic signal outside the reservoir and thus to control the homogenization process of the seismic amplitudes, 2) indicate where and to what extent the seismic response varies within the reservoir and therefore help to interpret these changes.

The seismic traces of three poststack cubes corresponding to three 3D seismic survey were used, from which three 60-ms thick cubes located approximately 70 ms above the reservoir and three 20-ms thick cubes located at the reservoir level were extracted.

The analysis of the cubes outside the reservoir studies to what extent the seismic signal is repeated from one survey to the next, whereas analysis of the seismic cubes located at the reservoir level allows studying the variations of the seismic method with time, induced by the reservoir development.

1-1 Outside the Reservoir

Figure 3:
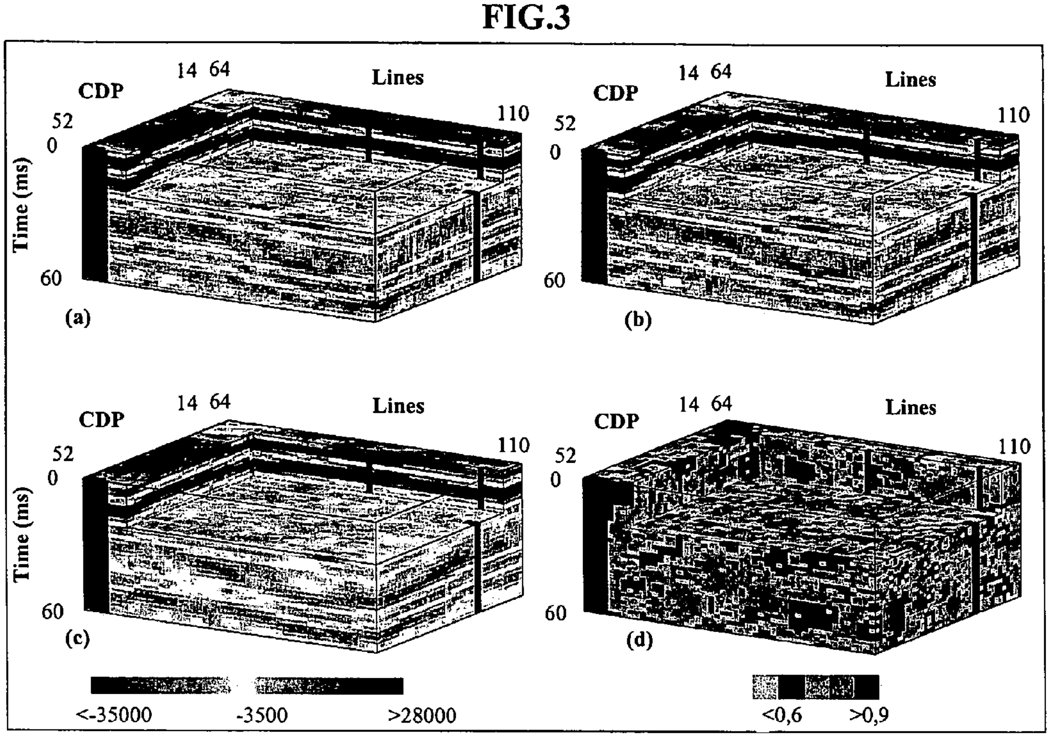
FIG. 3 shows the seismic cubes (a), (b) and (c) obtained after three repeated seismic surveys and the associated coherence cube (first implementation mode or approach)—Time window outside the reservoir.

A coherence attribute was first calculated according to the first calculation method on a part located well above the reservoir (70 ms) so that the seismic records are not influenced by the reservoir development. The variance threshold was set to 99%, thus allowing accounting for almost all of the information explained by the synthetic variables extracted from the GPCA, and also not to take into account synthetic variables explaining too small a part of the variance. The size of the neighborhood of the current point used for calculation of the coherence is 25 traces (a 5-trace side cube centered on the current point) of 4 ms each. FIG. 3 shows the three seismic cubes corresponding to the three surveys, and the associated coherence cube. Contrary to what could be expected, FIG. 3 shows that the three surveys are not perfectly coherent since values below 0.7 are obtained.

Figure 4:
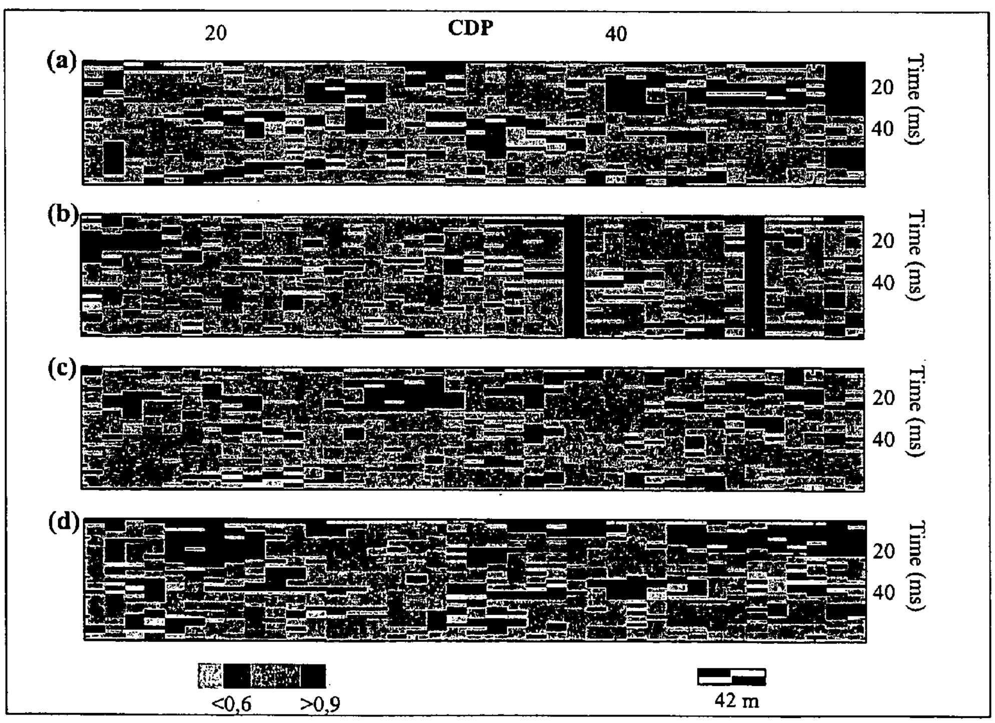
FIG. 4 shows lines extracted from the coherence cube—(a) line 10, (b) line 20, (c) line 30, (d) line 40.

The three seismic surveys seem to be relatively coherent on the first 22 ms with a majority of values above 0.8 (FIG. 4). Beyond that figure, there are locally more zones having a low coherence value, with a majority of values ranging between 0.7 and 0.8 and, locally, values below 0.7.

Figure 5:
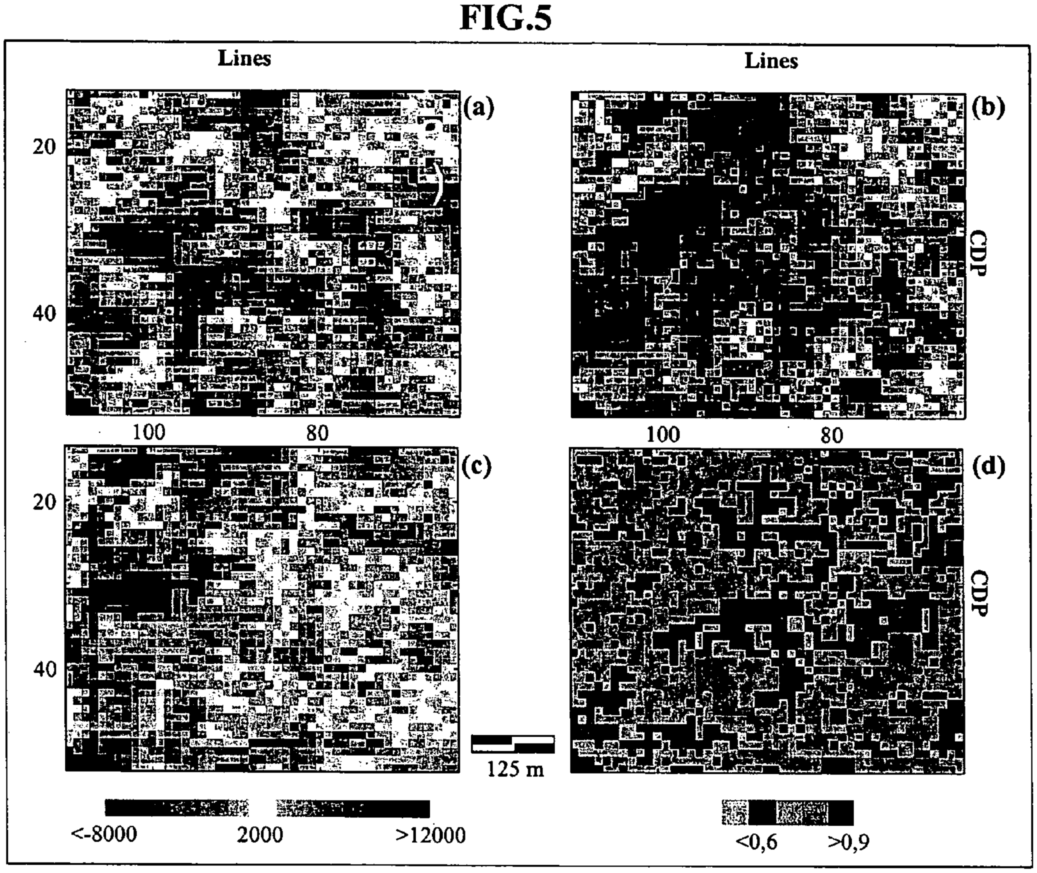
FIG. 5 shows a plane located 28 ms below the top extraction from the cubes of the same three surveys and the same coherence cube.

This is illustrated by FIG. 5 which shows the temporal plane, located +30 ms below the top of the cube, for the three seismic surveys and the coherence cube. The values below 0.8 are the majority and are distributed throughout the temporal plane. The record sections of the three surveys confirm this lack of 4D coherence.

The coherence cubes according to the other two methods were also calculated from the same seismic cubes.

Figure 6:
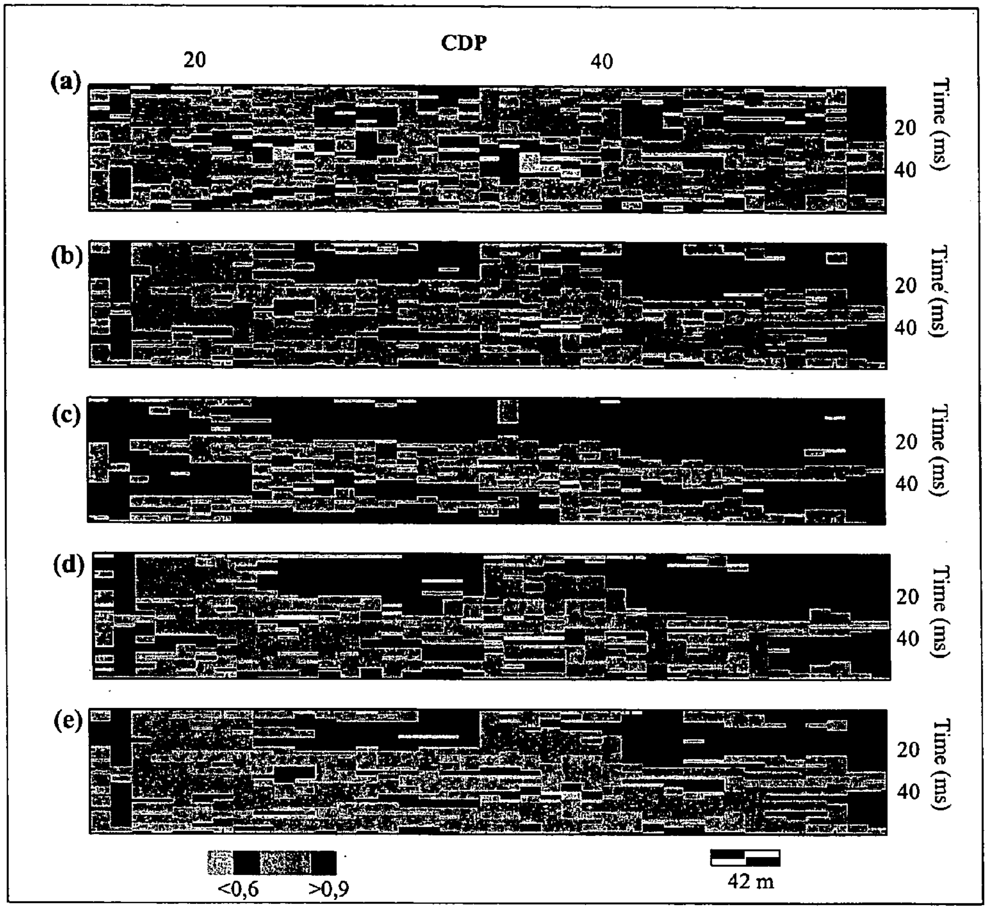
FIG. 6 shows line 10 extracted from the coherence cube calculated according to the first implementation mode with a 99% threshold (a), according to the third mode with a 99% (b), 90% threshold (c), according to the second implementation mode with the first synthetic variable (d), the first two synthetic variables (e)

FIG. 6 shows line 10 extracted from the coherence cubes calculated according to the first method with a threshold set at 99% (a), according to the third method with a threshold of 99% (b), 90% (c), according to the second method with the first synthetic variable (d), the first two synthetic variables (e).

All the sections obtained are globally quite similar. Section (c) shows higher coherence values than section (b): the additional variance part taken into account therefore seems to correspond to a less common local information part, thus causing the coherence to move downwards.

The coherence values seem to be a little higher when weighted by the variance than when a simple average is calculated. Section (e) is similar to section (b) and section (d) is similar to section (c): it therefore seems that, in most cases, locally, two synthetic variables are enough to summarize all of the information.

Section (e) has a little more low-coherence values than section (d). Similarly, the zones of very high coherence (values above 0.9) are a little less large in the second case. On the other hand, the coherence slightly increases in some few zones. Globally, the results obtained are not fundamentally different, although addition of the second synthetic variable to the coherence attribute calculation causes more variance to be taken into account. Addition of the second synthetic variable thus confirms the similarities or dissimilarities that had already been observed with a single attribute synthetic variable. In conclusion, for this analysis carried out outside the reservoir, a single synthetic variable can be enough to calculate the coherence attribute.

The results are not detailed here, but it has been checked that, when decreasing the number of traces defining the neighborhood (9 instead of 25), the coherence cubes obtained have a spatially more noise-containing aspect. Similarly, it has been checked that, by increasing the vertical dimension of the seismic traces, the coherence cube obtained is vertically smoothed: in this case, the very low coherence values observed in FIG. 5 are slightly higher. When taking account of two or three synthetic variables, or when setting a 99% variance threshold, there are fewer zones with low coherence values.

Whatever the method, it appears that the cubes located outside the reservoir are not totally coherent: which may be due to an imperfect amplitude homogenization process, or to a certain influence of the reservoir development on the amplitudes.

Figure 7:
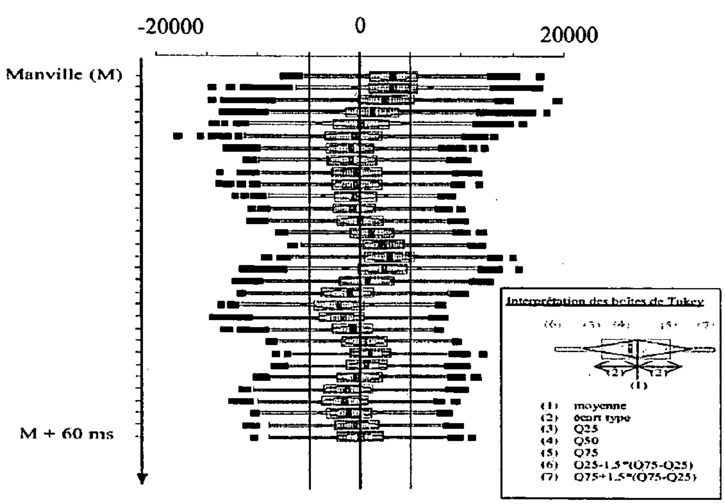
FIG. 7 shows examples of distribution of the amplitude differences between two seismic surveys.

FIG. 7 shows the distributions of the amplitude differences between two successive surveys several years apart, within the time window studied. In case of perfect signal reproducibility, the median or mean values should be centred on 0, and the distributions should not be very spread out. Now, it clearly appears that this hypothesis is correct only between 8 and 24 ms in the example considered. Elsewhere, the distributions fluctuate around 0, with a maximum median value reached at about 30 ms. This global amplitude difference measurement therefore confirms the more local result obtained with the coherence attribute.

1-2 In the Reservoir

A coherence attribute was then calculated within the reservoir according to the first method. The variance threshold was set to 99%. The dimension of the neighborhood of the current point for calculation of the coherence is 25 traces of 4 ms each. The reservoir zone corresponds to a 20-ms thickness.

Figure 8:
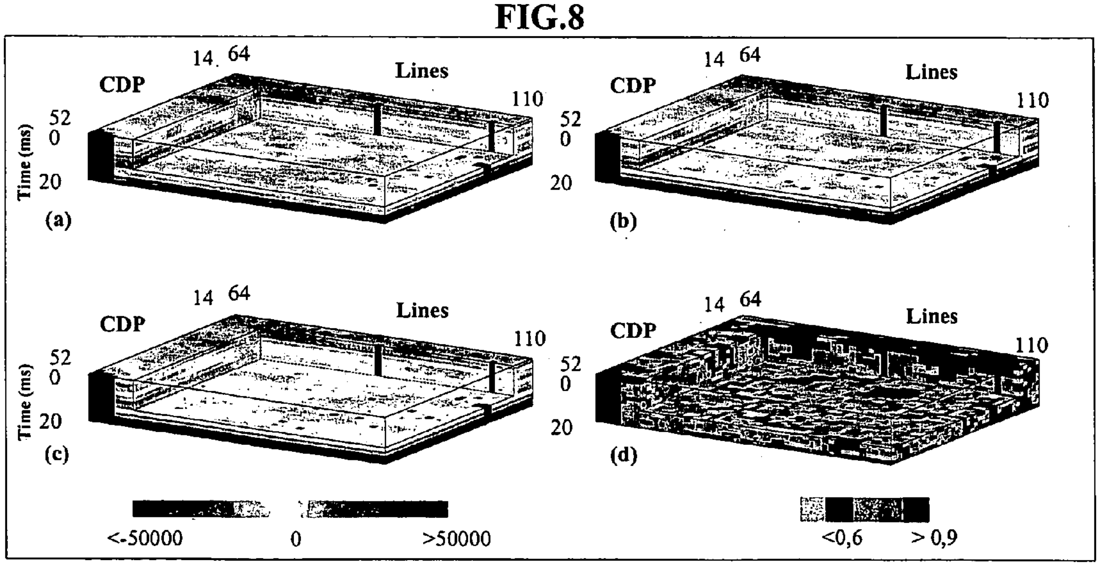
FIG. 8 shows the seismic cubes associated with the three successive surveys and the associated coherence cube, in a time window at the level of the reservoir.

FIG. 8 shows the three seismic surveys and the associated coherence cube. The zones showing the lowest coherence values seem to be located at the base of the reservoir, in the southern two thirds. The coincidence between the location of the wells allowing production and the low coherence values backs up the interpretation in terms of 4D variations and not simply in terms of seismic noise, as might be done considering the non-perfect reproducibility of the signal shown above with the coherence attribute in the zone outside the reservoir.

Figure 9:
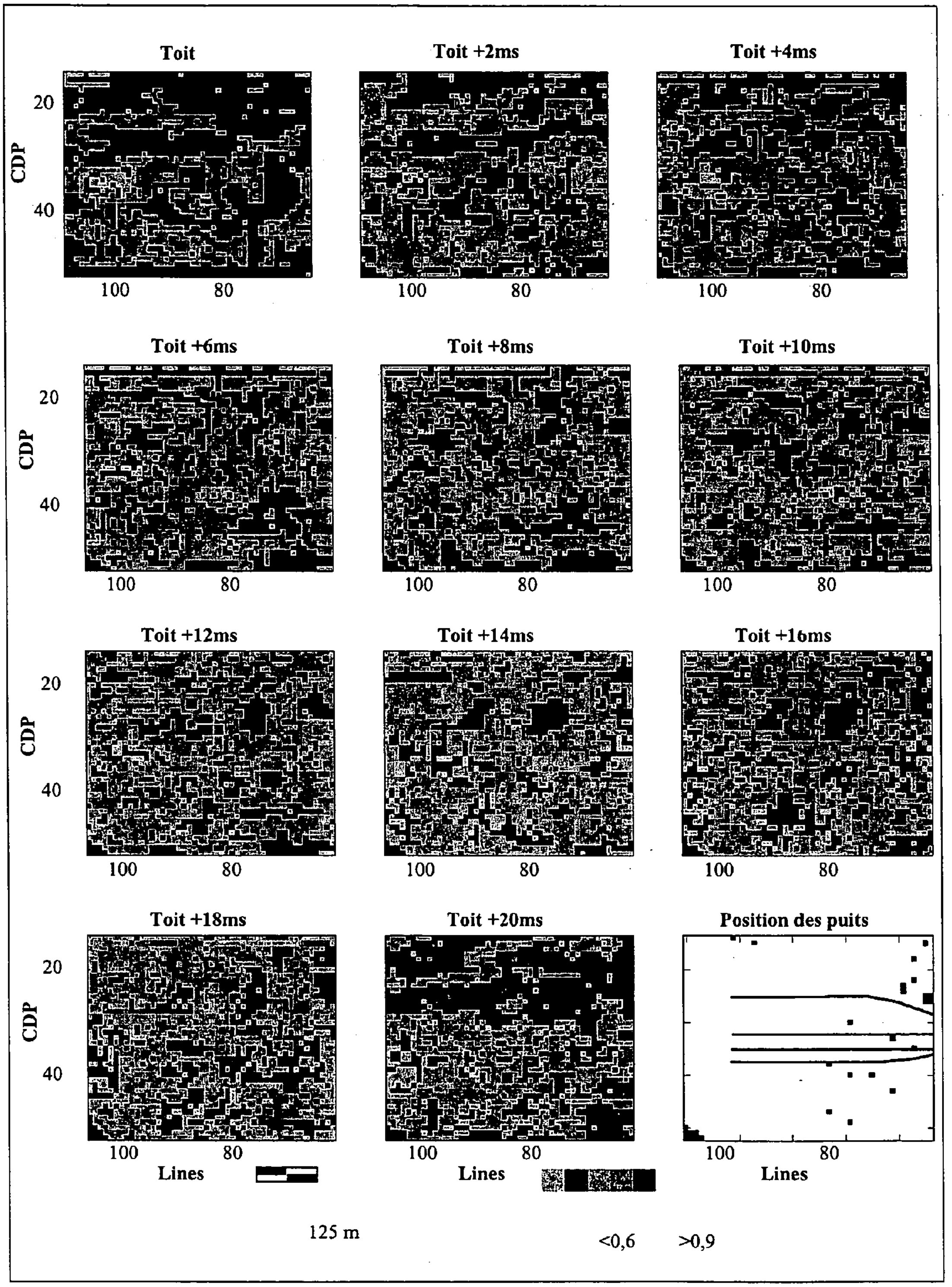
FIG. 9 shows the temporal planes extracted from the coherence cube calculated on the reservoir.

This is confirmed by FIG. 9 showing the eleven temporal planes of the coherence cube. Although it is not totally immutable, the northern third seems not to change from one survey to the next, with coherence values mainly above 0.8 over the total thickness of the reservoir; slight variations can however be observed between CDP 80 to 90 and lines 14 to 20 for the planes located 12 ms to 16 ms below the top of the reservoir. The south-eastern corner of the reservoir also remains unchanged from one survey to the next. These zones therefore seem not to be too much influenced by the field development: they can be considered as a reservoir zone of lower quality in terms of porosity/permeability.

The wide zones of very low coherence values at the base coincide with the presence of three of the four steam injection and oil recovery wells, as well as in the southern part below these wells, which points to an invasion by the steam injected in this zone. Similarly, the zone of very low coherence at the top is located plumb with the end of the four wells: here again, this zone can correspond to steam rising at the end of the wells.

On the other hand, the northernmost well coincides with a slightly more coherent zone beyond line 80. This well is located at the boundary with the zone considered to be a less good reservoir; the steam injected could influence more the part located more south to this well.

Figure 10:
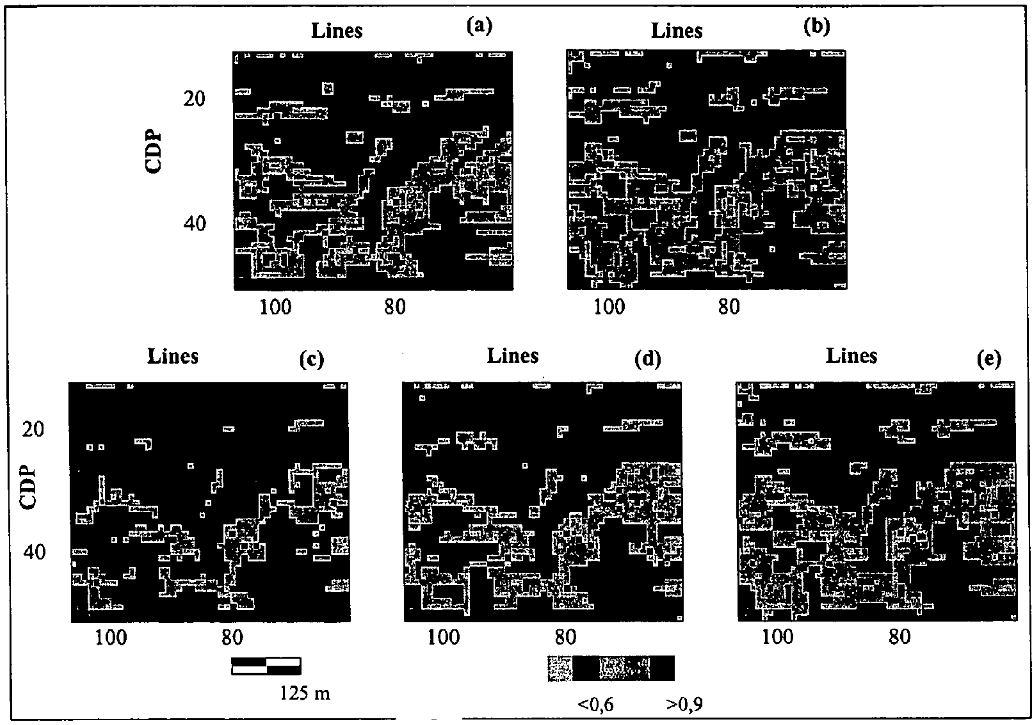
FIG. 10 shows the temporal plane located 12 ms below the top of a reservoir and the coherence attribute calculated with the first synthetic variable (a), the first two synthetic variables (b), with a 90% (c), 95% (d), 99% (e) variance threshold.

FIG. 10 shows the temporal plane located 12 ms below the top of the reservoir extracted from the coherence cubes calculated according to the other two approaches: for the first method by taking into account a single synthetic variable (a), two synthetic variables (b), for the second method by setting a 90% (c), 95% (d) and 99% (e) variance threshold. The two maps (a) and (b) are very similar, but they are also very similar to maps (d) and (e) respectively. Addition of a second synthetic variable, as for the outside-the-reservoir case, does not seem to change the interpretation that could be given. Globally, it seems that two synthetic variables are enough to explain almost all of the initial variance of each group of attributes analyzed. Similarly, taking into account the additional variance between maps (d) and (e) does not change the coherences obtained, except for small details. On the other hand, map (c) appears to be much more coherent than the other two maps. The additional local variance part taken into account thus corresponds, in most cases, to information that is less common to the three cubes considered. The coherence values obtained in this case are higher than the coherence values obtained by means of a simple average (see the corresponding map in FIG. 9).

Figure 11:
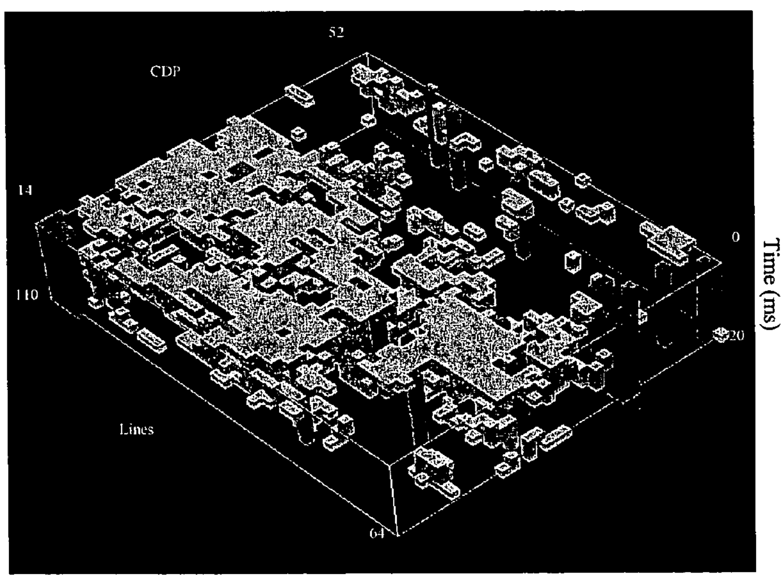
FIG. 11 shows a 3D view of the coherence cube obtained with the first two synthetic variables (second approach)—coherence values strictly below 0.8.

FIG. 11 shows a 3D view of the coherence cube obtained with two synthetic variables and grouping together the coherence values strictly below 0.8. It clearly appears that the northern third is unchanged, as well as the north-eastern corner. Similarly, only the two thirds at the south seem to change.

2—Application to Prestack Seismic Data

The methodology can also apply to prestack seismic surveys: in this case, the existence of coherent zones in the AVO data has to be determined from several iso-angle or iso-offset 3D seismic cubes.

The data used has five iso-angle cubes covering an oil reservoir (channel with gritty deposits). The thickness of the sequence studied is 38 ms.

The size of each neighborhood is 5 lines by 5 CDP, i.e. a total of 25 traces. The vertical dimension taken is 4 ms, that is three time samples. The coherence cube was calculated according to the first method (simple average) with a 99% variance threshold.

Figure 12:
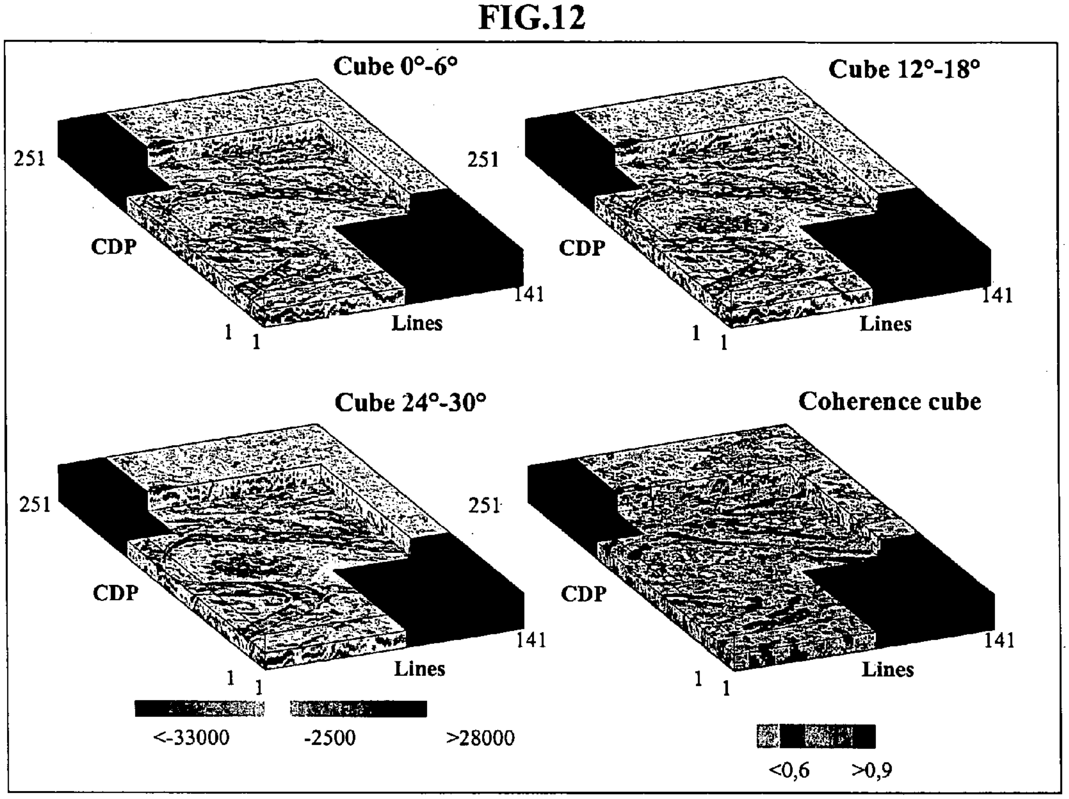
FIG. 12 shows iso-angle 0°–6°, 12°–18°, 24°–30° seismic cubes and the associated coherence cube.

FIG. 12 shows three of the five iso-angle cubes used (0°–6°, 12°–18° and 24°–30° cubes), as well as the coherence cube obtained. In the latter cube, the most coherent zones appear in orange and red, and the least coherent zones in green and blue. The borders of a channelling structure clearly appear in form of coherent zones.

Figure 13:
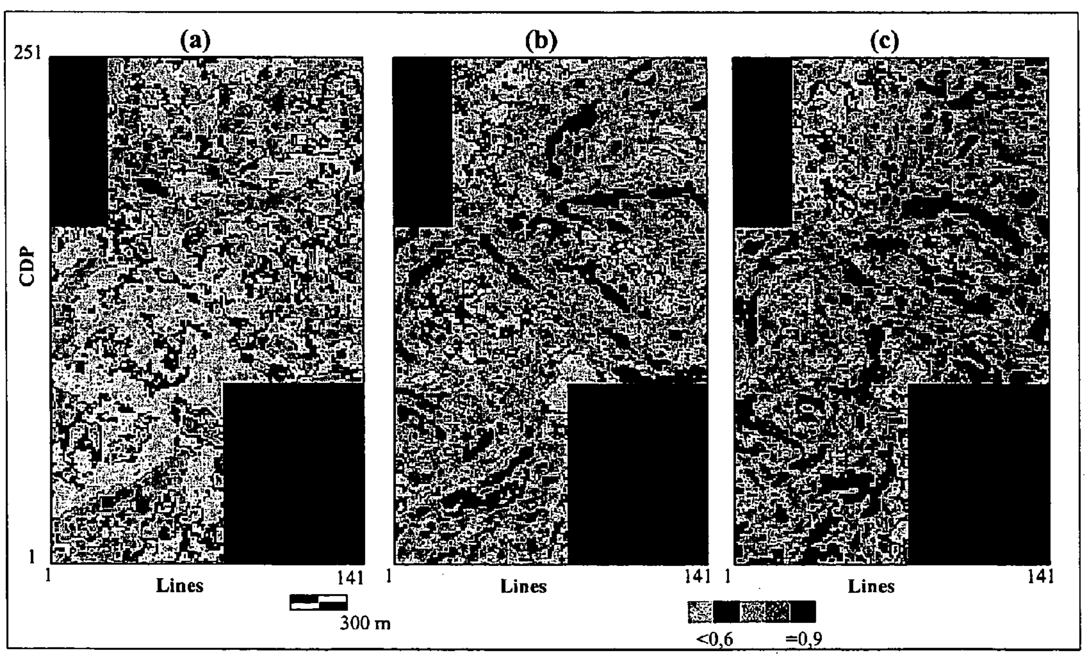
FIG. 13 shows three temporal planes located (a) 4 ms, (b) 10 ms, (c)16 ms below the top of the reservoir and extracted from the coherence cube.

Globally, the least coherent zones are essentially located in the upper part of the reservoir window studied (FIG. 13, map a), except for a very coherent small zone in the northwest corresponding to a great amplitude anomaly that can be seen in all the angle cubes.

In the median part (map b), the most coherent zones follow the outline of the channelling shape, the channel itself corresponding to coherence values below 0.8. In the lower part of the window (map c), there are fewer incoherent zones which are essentially located in the northeast and in the southwest.

The least coherent zones seem to highlight seismically more blind zones or seismic zones for which the markers are not observed from one angle cube to the next.

Figure 14:
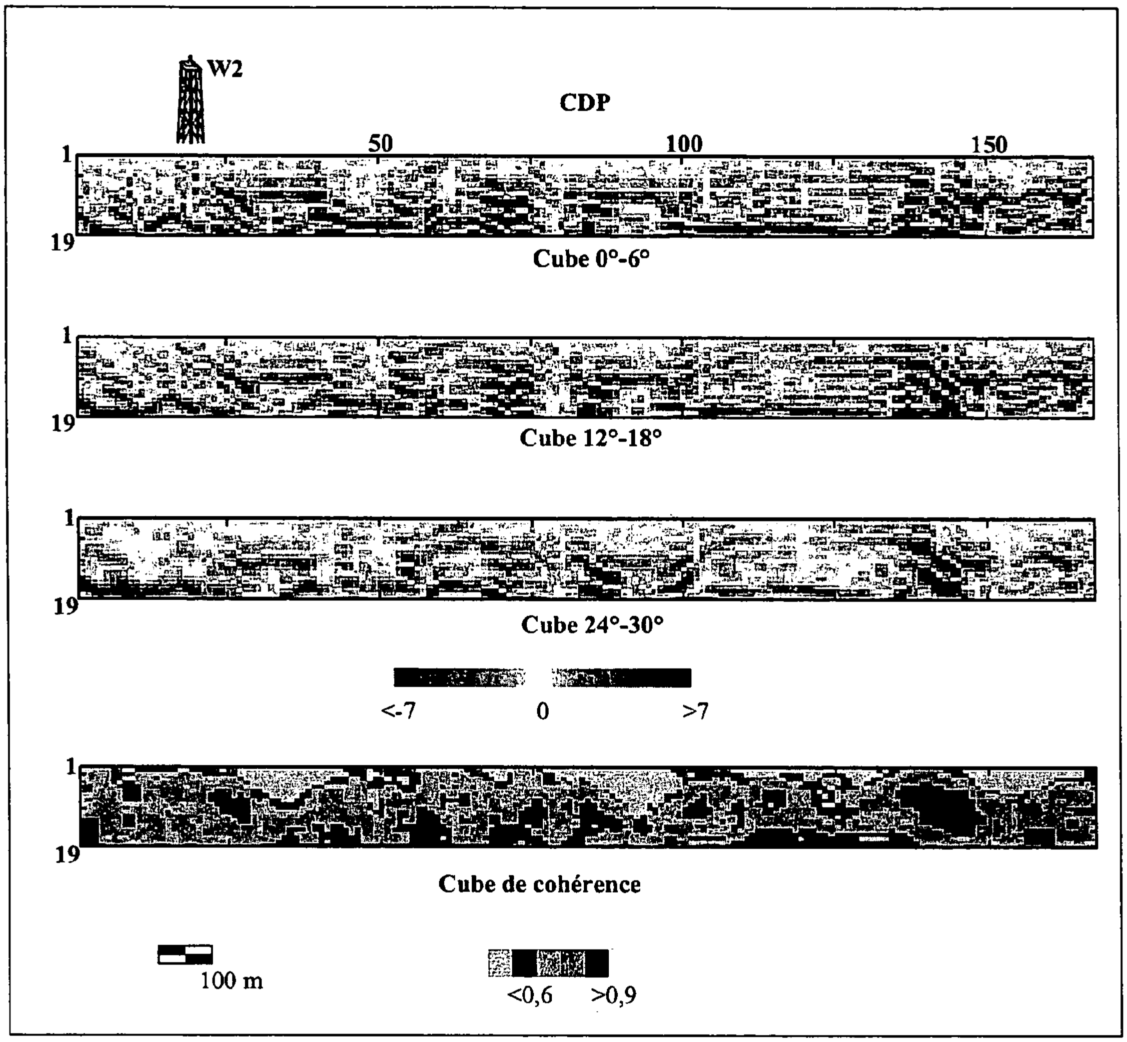
FIG. 14 shows a line passing through a well W2 extracted from the 0°–6°, 12°–18°, 24°–30° seismic cubes and from the coherence cube.

FIG. 14 shows the line passing through a well W2, extracted from the 0°–6°, 12°–18° and 24°–30° seismic cubes, and the same line extracted from the coherence cube. The zones corresponding to the channels are relatively well marked by low coherence values in the upper part thereof, and by higher values in the lower part. The coherent zones correspond to high-amplitude markers that can be found in the various angle cubes.

It has also been checked that, by decreasing the number of traces taken into account in the neighborhood, the coherence cube obtained takes a more noise-affected aspect. Similarly, it has been checked that, when increasing the vertical dimension of the seismic traces of the neighborhood, the coherence cube obtained is vertically smoothed.

The AVO coherence attribute thus shows the degree of coherence of the seismic cubes extracted in the neighborhood of the points and considered as a function of the angle. Consequently, the incoherent zones can be interpreted either as seismic noise or as particular lithologic facies, transparent from a seismic point of view (this is showing no reflectors), or as great amplitude variations as a function of the angle (due to the fluid content for example). It is therefore interesting to account for this coherence attribute in the interpretation of reservoirs, as a complement to other attributes.

The invention claimed is:

1. A method of measuring local similarities between a number P of seismic trace cubes obtained by seismic exploration of a single volume of an underground zone, comprising:

a) extracting, from each seismic trace cube, a volume neighborhood centered on a single current point including a set of seismic traces;

b) applying a generalized principal component analysis technique to groups of seismic attributes extracted from the seismic traces of the volume neighborhood so as to form synthetic variables;

c) determining a coherence value from the synthetic variables, which is assigned to a current point;

d) repeating steps a) to c) for each point common to the seismic trace cubes; and e) grouping all of the coherence values to form a coherence cube showing the local similarities.

2. A method as claimed in claim 1, wherein:

for each point, the coherence value is the mean value of the squares of correlations between a number K of the synthetic variables and projections thereof on cubes in a neighborhood of the current point.

3. A method as claimed in claim 2, wherein:

a value of the number K of synthetic variables is determined as a smallest number of synthetic variables allowing reaching a variance threshold explained by the projections of the synthetic variables on the cubes in the neighbourhood of the current point with the variance threshold being previously selected.

4. A method as claimed in claim 1, wherein:

the number K of synthetic variables is selected depending on correlations thereof with groups of attributes associated with the volume neighborhood of the current point, the coherence value assigned to the current point being equal to a weighted sum of squares of the correlations between considered synthetic variables and the projections thereof on the cubes in the neighborhood of the current point.

5. A method as claimed in claim 2, wherein:

the number K of synthetic variables is selected depending on correlations thereof with groups of attributes associated with the volume neighborhood of the current point, the coherence value assigned to the current point being equal to a weighted sum of squares of the correlations between considered synthetic variables and the projections thereof on the cubes in the neighborhood of the current point.

6. A method as claimed in claim 3, wherein:

the number K of synthetic variables is selected depending on correlations thereof with groups of attributes associated with the volume neighborhood of the current point, the coherence value assigned to the current point being equal to a weighted sum of squares of the correlations between considered synthetic variables and the projections thereof on the cubes in the neighborhood of the current point.

7. A method as claimed in claim 4, wherein:

for a determined correlation value, a weighting value is selected which is a variance percentage explained by a projection of the synthetic variable on a corresponding group divided by a sum of variances of all the projections of the synthetic variables considered for a same group.

8. A method as claimed in claim 5, wherein:

for a determined correlation value, a weighting value is selected which is a variance percentage explained by a projection of the synthetic variable on a corresponding group divided by a sum of variances of all the projections of the synthetic variables considered for a same group.

9. A method as claimed in claim 6, wherein:

for a determined correlation value, a weighting value is selected which is a variance percentage explained by a projection of the synthetic variable on a corresponding group divided by a sum of variances of all the projections of the synthetic variables considered for a same group.

10. A method as claimed in claim 1, wherein:

a threshold is set on a variance percentage explained by the projections of synthetic variables on cubes in the neighborhood of the current point which is taken into account, the coherence value being equal to a weighted sum of squares of the correlations between the synthetic variables and projections thereof on the cubes in the neighborhood of the current point, so that a number of synthetic variables accounted for allows the threshold to be reached.

11. A method as claimed in claim 2, wherein:

a threshold is set on a variance percentage explained by the projections of synthetic variables on cubes in the neighborhood of the current point which is taken into account, the coherence value being equal to a weighted sum of squares of the correlations between the synthetic variables and projections thereof on the cubes in the neighborhood of the current point, so that a number of synthetic variables accounted for allows the threshold to be reached.

12. A method as claimed in claim 3, wherein:

a threshold is set on a variance percentage explained by the projections of synthetic variables on cubes in the neighborhood of the current point which is taken into account, the coherence value being equal to a weighted sum of squares of the correlations between the synthetic variables and projections thereof on the cubes in the neighborhood of the current point, so that a number of synthetic variables accounted for allows the threshold to be reached.

13. A method as claimed in claim 4, wherein:

a threshold is set on a variance percentage explained by the projections of synthetic variables on cubes in the neighborhood of the current point which is taken into account, the coherence value being equal to a weighted sum of squares of the correlations between the synthetic variables and projections thereof on the cubes in the neighborhood of the current point, so that a number of synthetic variables accounted for allows the threshold to be reached.

14. A method as claimed in claim 5, wherein:

a threshold is set on a variance percentage explained by the projections of synthetic variables on cubes in the neighborhood of the current point which is taken into account, the coherence value being equal to a weighted sum of squares of the correlations between the synthetic variables and projections thereof on the cubes in the neighborhood of the current point, so that a number of synthetic variables accounted for allows the threshold to be reached.

15. A method as claimed in claim 6, wherein:

a threshold is set on a variance percentage explained by the projections of synthetic variables on cubes in the neighborhood of the current point which is taken into account, the coherence value being equal to a weighted sum of squares of the correlations between the synthetic variables and projections thereof on the cubes in the neighborhood of the current point, so that a number of synthetic variables accounted for allows the threshold to be reached.

16. A method as claimed in claim 7, wherein:

a threshold is set on a variance percentage explained by the projections of synthetic variables on cubes in the neighborhood of the current point which is taken into account, the coherence value being equal to a weighted sum of squares of the correlations between the synthetic variables and projections thereof on the cubes in the neighborhood of the current point, so that a number of synthetic variables accounted for allows the threshold to be reached.

17. A method as claimed in claim 8, wherein:

a threshold is set on a variance percentage explained by the projections of synthetic variables on cubes in the neighborhood of the current point which is taken into account, the coherence value being equal to a weighted sum of squares of the correlations between the synthetic variables and projections thereof on the cubes in the neighborhood of the current point, so that a number of synthetic variables accounted for allows the threshold to be reached.

18. A method as claimed in claim 9, wherein:

a threshold is set on a variance percentage explained by the projections of synthetic variables on cubes in the neighborhood of the current point which is taken into account, the coherence value being equal to a weighted sum of squares of the correlations between the synthetic variables and projections thereof on the cubes in the neighborhood of the current point, so that a number of synthetic variables accounted for allows the threshold to be reached.

19. A method as claimed in claim 10, wherein:

for a correlation value, a weighting value is selected which is P times a variance threshold selected.

20. A method as claimed in claim 1, wherein:

a volume neighborhood is extracted from seismic trace cubes obtained after a 3D seismic survey with each cube corresponding to a same incidence angle.

21. A method as claimed in claim 1, wherein:

a volume neighborhood is extracted from seismic trace cubes obtained after a 3D seismic survey with each cube corresponding to a same offset.

22. A method as claimed in claim 1, wherein:

a volume neighborhood is extracted from seismic trace cubes obtained by successive seismic explorations of the zone.

23. A method as claimed in claim 1, wherein:

a volume neighborhood is extracted from residue cubes obtained after a prestack stratigraphic inversion.

24. A method as claimed in claim 1, wherein:

a volume neighborhood is extracted from residue cubes obtained after a poststack stratigraphic inversion.

25. A method as claimed in claim 1, wherein:

a volume neighborhood is extracted from prestack or poststack inverted trace cubes and from residue cubes.

* * * * *